United States Patent [19]

De La Cierva, Sr. et al.

[11] Patent Number: 4,668,999
[45] Date of Patent: May 26, 1987

[54] TIME BASE EQUALIZER AND CORRECTOR (TIBEC) FOR VIDEO TAPE OR DISK MACHINES IN PLAYBACK MODES

[76] Inventors: Juan De La Cierva, Sr.; Juan De La Cierva, Jr., both of 1450 NW. 78 Ave., Miami, Fla. 33126

[21] Appl. No.: 677,975

[22] Filed: Dec. 4, 1984

[51] Int. Cl.[4] .............................................. H04N 5/782
[52] U.S. Cl. .................................. 360/14.1; 360/36.1; 358/22; 358/337; 358/148
[58] Field of Search ................... 360/14.1, 14.2, 14.3, 360/15, 36.1, 36.2, 70, 33.1; 358/335, 320, 337, 148, 149, 150, 151, 181, 182, 183, 185

[56] References Cited
U.S. PATENT DOCUMENTS

| | | | |
|---|---|---|---|
| 4,158,857 | 6/1979 | Hiraguri | 358/148 |
| 4,410,917 | 10/1983 | Newdoll et al. | 360/15 |
| 4,532,547 | 7/1985 | Bennett | 358/148 |

Primary Examiner—Donald McElheny, Jr.
Attorney, Agent, or Firm—Jesus Sanchelima

[57] ABSTRACT

A time base video equalizer and/or corrector for video tape or disk machines including a precorrector and a postcorrector section. The device is driven by a master video source, corrected or not, and synchronization with a slave video machine is achieved for the operation of interfaced special effects video devices. The jitter and coherence imperfections of the master video signal are followed by the slave machine thereby equating or synchronizing their timing components.

4 Claims, 5 Drawing Figures

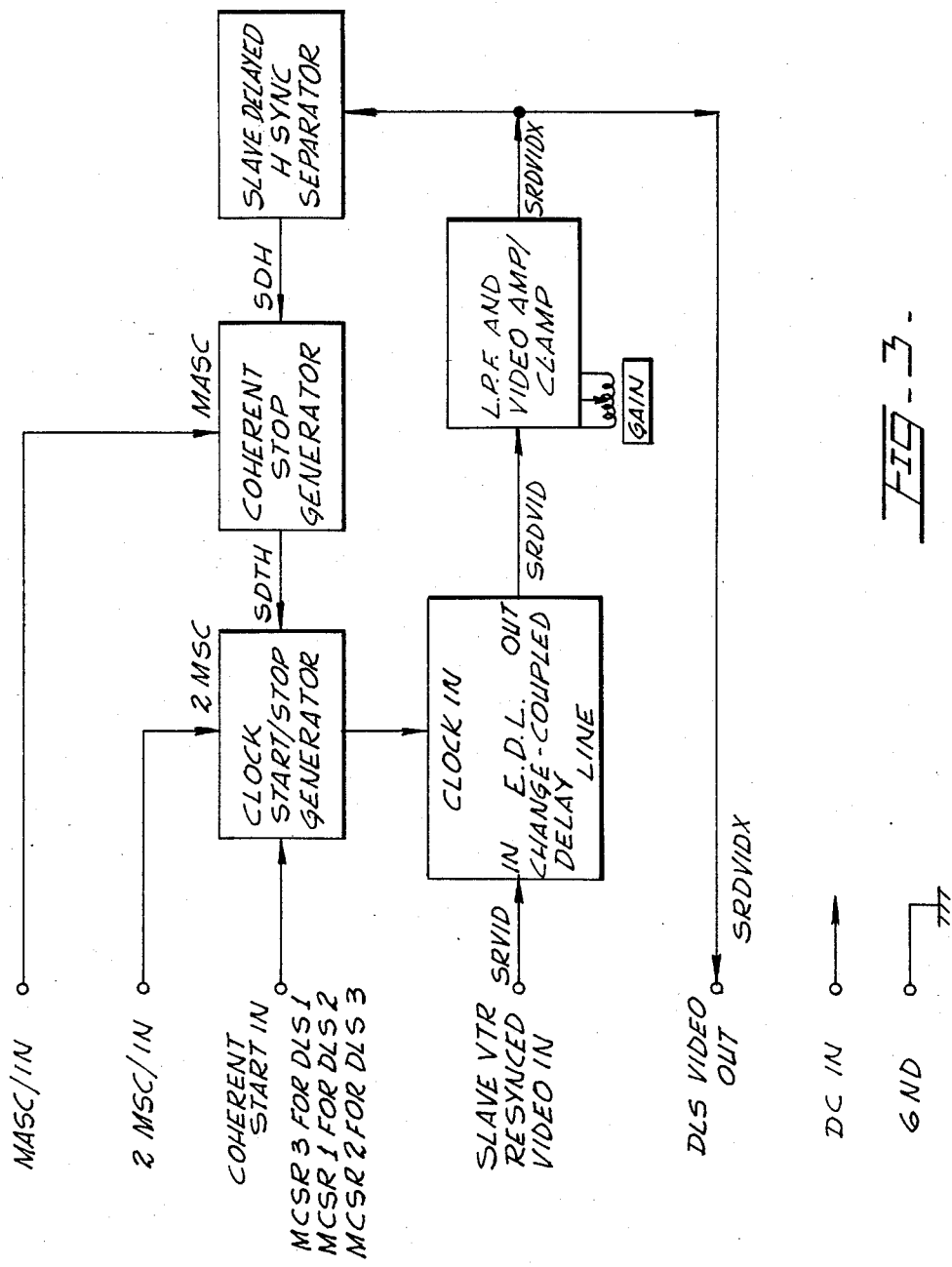

TIME BASE EQUALIZER AND CORRECTOR (TIBEC) FOR VIDEO TAPE OR DISK MACHINES IN PLAYBACK MODES

BACKGROUND OF THE INVENTION

1. Field of the Invention

The present invention relates to a video signal processing device, hereinafter referred to as the invention or TIBEC (time base equalizer and/or corrector), that equalizes or corrects the timing errors generated by video tape or disk machines operating in playback mode.

2. Description of the prior art

Present-day helical-scan video tape machines or video disk playback machines, when operated in playback mode, reproduce a video signal (hereinafter referred to as INCORRECT video), that exhibits two peculiar—and non standard—characteristics: jitter and incoherence.

a. "INCORRECT" Video Definition.

i. Jitter and Cummulative Jitter.

The horizontal timing of the playback video exhibits a significant degree of instability, hereinafter referred to as JITTER. The instability is well outside the limits stated in EIA standard RS-170-A. Furthermore, the jitter is cumulative, i.e., the duration of consecutive played-back horizontal lines may be longer (or shorter) than the duration for consecutive standard lines, so the accumulated time deviation of the VTR signal as compared with a standard signal may reach several horizontal (H) intervals at the peak of one cycle of accumulation.

The jitter is mostly caused by the inability of the VTR's to control the rotation speed of the drum servos when on playback, and keep it constant or, at the least, identical to the drum rotation speed during recording. The effect is further aggravated when recording or playback takes place while the machine is rotating with vector components of its angular speed perpendicular to the drum shaft. Gyroscopic torques are created by the combination of its angular momentum and machine rotation, and these torques, plus the increased shaft friction torques, can not be compensated by the drum servos and drive motors. Since a full video frame, consisting of 262.5 lines of video is recorded on each semi-revolution of the drum, it is quite obvious that these speed differences result in an inherent jitter of the playback video signal. The recording and playback timing errors are directly proportional to the drum speed differences when recording and playing back the same video frame. The playback H interval elongates if the speed difference is positive, and shortens if the difference is positive. The speed difference is largely random, and when one of the two conditions lasts for periods of several H lines, accumulated jitter is the inevitable result.

ii. Incoherence.

The phase relationship between the horizontal sync and the color subcarrier burst of the playback signal is completely lost, even if a correctly phased signal is used for recording. This condition, by itself and separately from the jitter, will be referred to in this report as incoherence.

Incoherence is the result of bandwidth compression required for recording broadband video signals in magnetic tape using small amounts of tape length, as conventionally done in heterodyne VTR's. On these machines, the chroma and luma contents of the video signal to be recorded are first separated. The signals are modulated on separate carrier frequencies and then combined and recorded by the same heads. In most "color under" machines, the chroma carrier frequency is lower than the luma carrier, due to the smaller bandwidth of the chroma information. At playback, both signals are reproduced together and then separated by frequency. The chroma is remodulated over a stable 3.58 MHz. carrier by heterodyne process, while the luma is just demodulated from its carrier. Luma and chroma are then mixed, resynced with a subcarrier burst derived from the stable 3.58 MHz. oscillator and then sent to the output terminal of the VTR. The result of such process inherently destroys the phase relationship between the horizontal sync,—that is recovered from the luma playback signals,—and the color subcarrier, that is regenerated from the stable 3.58 MHz. oscillator after the hetrodyne process takes place and, consequently, is independent of the luma timing.

iii. Summary of Incorrect Video Definition.

In summary, and using the terminology just defined in the above paragraphs, a VTR playback video signal is INCORRECT video, i.e., it has JITTER and/or it is INCOHERENT.

Incorrect Video in TV Sets and Monitors.

Television receivers, video monitors and VTR's are indeed capable of extracting the luma and chroma information of the incorrect video. Of course, such capability is the fundamental design criterium of any VTR, and lays at the base of the acceptance and widespread use of these machines.

The Slave Video timing errors are CORRECTED when a correctly timed video signal is applied to the Master Video input of the device. The expression "correct timing", as used in this document, refers to a video signal that complies with the National Television Advisory Commitee (NTSC) standard, as further defined by the Electronics Industries of America (EIA) Tentative Standard RS-170-A of Nov. 8, 1977, or other video standards such as PAL, SECAM etc. in use in countries other than the U.S.A.

Furthermore, the present invention also permits to alter the timing errors of the Slave video playback machine, and make them EQUALIZE, or "make them equal" to the timing errors of the incorrect video signal created by a free-running video tape machine or a standard, hereinafter Master video, connected to the Master Video input of the device.

This report refers to the NTSC video standard used in the U.S. and in other countries including Japan. However, the field of the present invention includes the same or similar circuits and claims applied to other television standards, such as PAL and SECAM, and is applicable to any other future video standard such as the emerging High Definition TV (HDTV).

Incorrect Video and Special Effects Generators.

The two characteristics of incorrect video make VTR playback video absolutely useless for the purpose of being combined or mixed in Special Effects Generators (S.E.G.'s), like Scitech's Model HS-3.

For the purpose of this application, "Special Effect" means the combination of two or more video signals sharing the same video line and/or video frame. Split Screens, Wipes, Dissolves etc. are examples of such Special Effects. Single-video effects, such as slow or fast motion, freeze frame and others, even if they are often referred to in the trade literature as Special Effects, they are not included in this definition.

For the generation of Special Effects, the horizontal timing and the color subcarrier phase of the video signals from both sources must be kept identical at all times. This assertion becomes obvious observing that the combined Special Effect Video shares the same H scan line, and, consequently, is decoded in relation to a single horizontal sync pulse for luma and a single subcarrier burst for the chroma.

Time Base Correction and Equalization.

Identical H timing and subcarrier phase does not mean that both videos must be referred to CORRECT parameters. For the purpose of Special Effects generation, the time base of both video signals involved must be equal, but not necessarily correct, or equal to a correct standard. If both signals are incorrect, but their H timing and subcarrier reference phase are equal, both signals can be used to generate Special Effects. The last condition is referred to in this report as 'equalized' videos.

As a separate consideration, VTR uncorrected playback signals do not comply with the NTSC standards mandated by the Federal Communication Commission for broadcast video signals. Consequently, they can not be legally aired without previous correction of its time base.

Prior Art TBC's: Correction Window.

Prior art Time Base Correctors (TBC's) correct the playback signals of slaved VTR's by temporarily storing a "window", consisting of a number of H lines, (usually 16 or more), and replaying the stored video with the proper velocity changes to restore a correct time base. The luma and chroma contents of the VTR video is separated before the storage process, that must be carried out by separate and duplicate circuitry for the luma and chroma subsignals.

The window of correction must be large enough to correct for the largest CUMMULATIVE error existent in the video signal. The storage process may be analog or digital.

Prior Art Dual TBC's Requirement.

For the generation of Special Effects, the TBC process must be applied to BOTH VTR's. Indeed, the two corrected signals are made equal to the same standard, and hence, are equal to each other. Equalization is thus achieved by correcting both signals to the same standard.

Several technical papers state that it is impossible to "track" the time base error of one VTR with another VTR. In the papers known by the inventors, no reason is given to support such assertion. The present invention does just that allegedly "impossible" task.

The Costly and Wasteful Dual TBC Requirement.

As mentioned before, re-recording from one VTR to another without time base correction is common practice, both in commercial tape reproduction and single source editing, as well as in consumer tape duplication.

The use of TWO TBC's for A/B roll—double source, namely: A and B—editing, as required by present art TBC's, is costly and wasteful. Costly, because two TBC's are required to correct the output of BOTH, A and B VTR's, and today's TBC's are expensive.

Wasteful, because the usual destination of the output of the two TBC's and Special Effect Generator (S.E.G.) is usually a third VTR used in recording mode. When the corrected and mixed signal is played back by the same or other VTR, the mixed signal will be played back as INCORRECT video again.

SUMMARY OF THE INVENTION

It is one of the main object of the present invention to provide a time base equalizer and/or corrector capable of operating in two modes, depending only on the type of signal connected to its MASTER input (video or stable timing reference):

MODE 1: TIME BASE EQUALIZER or TBE Mode, where the time base (vertical, horizontal and color subcarrier) of one VTR playback signal connected to the SLAVE Video input of the device is made EQUAL to the time base of a second signal (Master) connected to the MASTER VIDEO input of the same device, even if the Master Video signal is incorrect video, i.e., contains jitter and/or is incoherent, such as the video signal originated at a free-running VTR or videodisk machine operated in playback mode.

MODE 2: TIME BASE CORRECTOR or TBC, where the time base (vertical, horizontal and subcarrier) of video signal connected to the SLAVE VIDEO input of the device is made equal to a correctly timed video signal connected to the MASTER VIDEO input of the device.

Another object of this invention is to provide a device that will improve the operating performance of a video tape recorder using an internal or external time reference signal that will eliminate the inherent horizontal jitter of unprocessed jitter playback video and will restore coherence between the horizontal and subcarrier components of the playback video.

It is another object of the present invention to provide an infinite horizontal correction range for the video signals of the Slave VTR, so the error is corrected no matter how large it is or what its cause is, be it timing errors on the recorded video, gyroscopic, servo induced or any other source of timing errors.

It is yet another object of the present invention to avoid circuitry providing duplication by a device that processes within the same circuitry the luma and chroma components of the video signal of the Slave VTR without previously separating both components, and corrects the time base of these signals to have an H and V timing equal to the H and V timing of the Master Video.

It is still another object of the present invention to provide a Postcorrecting circuit that further processes the output of the Precorrector section and reduces the residual luma jitter from a maximum of 0 to 558 nanoseconds to any desired value.

It is yet another object of the Postcorrector section of the device to provide chroma correction circuits that align—in complete cycles—the chroma of the Precorrector device—without affecting its phase—, until it coincides with the cycle of the Master Subcarrier nearest to its original position in relation to the luma of the Slave Video Signal.

It is another object of the present invention to provide a device that restores the coherence of a video signal that, at its input on the device, is incoherent for any cause, including limitations of Video Tape Recorders, Video Disk playback machines, or any other causes.

It is yet another object of the present invention to provide a device that synchronizes the horizontal and subcarrier portions of a video signal generated at a source beyond the control of the device operator- ,—such as "off the air" broadcast video—, with the horizontal and subcarrier portions of a correct or incorrect video signal connected to the Master Input of the device.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 is a block diagram of the Delay-Sync Units shown in FIG. 2.

DETAILED DESCRIPTION OF THE PREFERRED EMBODIMENT

Figure 1:
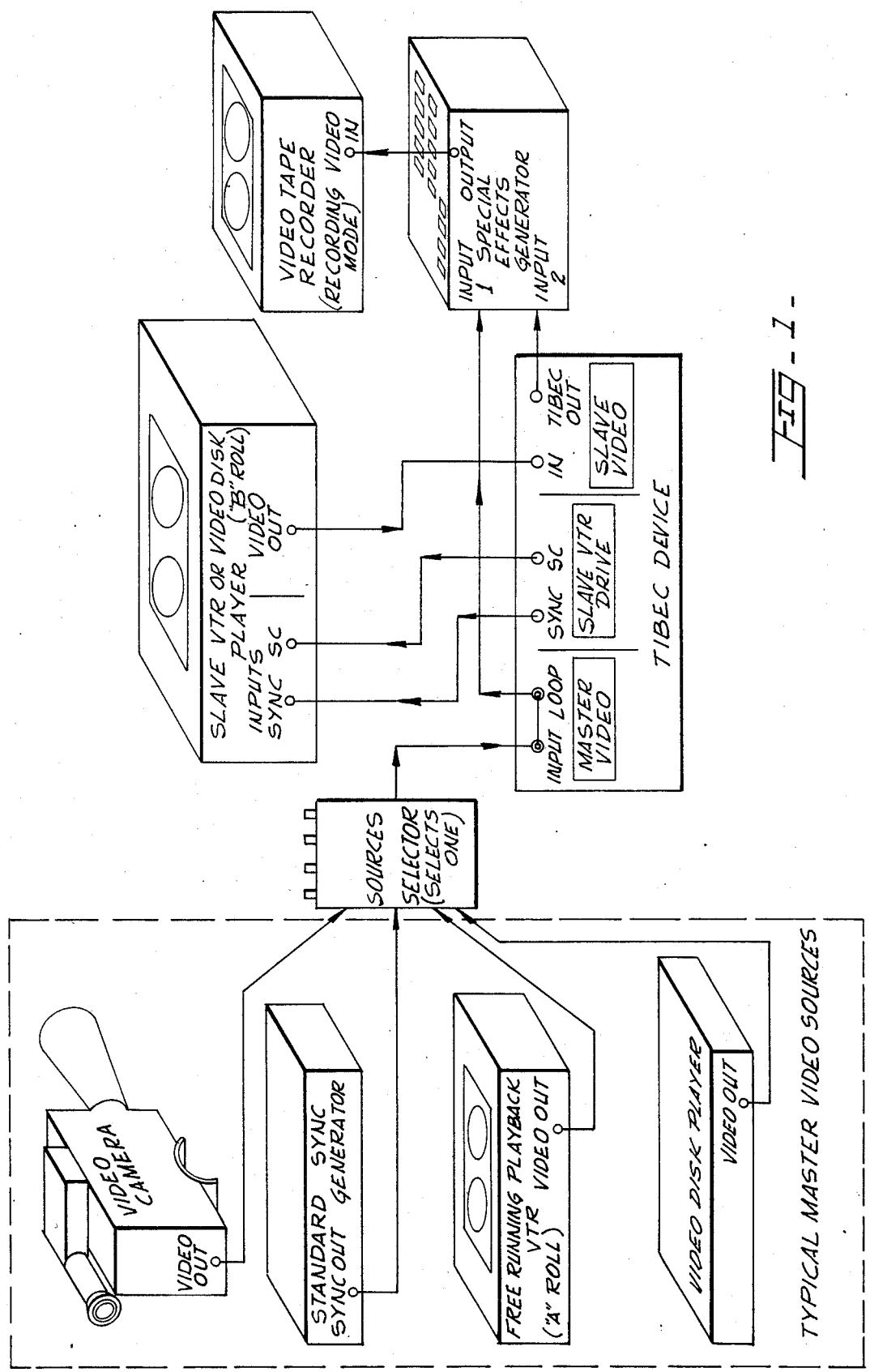
FIG. 1 is a diagram of the general connection of the TIBEC device including its external connectors and its connection to peripheric equipment.

Referring now to FIG. 1, a general interconnection of the TIBEC device with other associated video equipment is shown. The figure shows all the equipment viewed from the connector panels. Four Master Video sources are illustrated. Indeed, only one must be connected to the TIBEC Master Input at any particular time. A looping circuit and load switch on the TIBEC Master Input permits to connect a Master Video output line and achieve proper line loading in all conditions. In a typical A/B Roll set-up, as illustrated, the Master Video is looped through the TIBEC Master Input and continues to one input of the S.E.G.

The TIBEC Slave Sync Drive has two connectors, labelled Sync Output 17 and SC (Subcarrier) Output 18. These outputs must be connected to the corresponding inputs of the Slave VTR or videodisk machine. Such inputs are present in most professional VTR's. If the Slave VTR does not have both of these inputs, a simple modification (described below) allows the installation of the missing inputs(s) in any VTR, including low cost, consumer type Video Cassette Recorders (VCR's).

The Slave VTR (incorrect) video output is connected to the SLAVE INPUT 62 of the TIBEC. The TIBEC device processes the Slave Video so that, after it is Equalized or Corrected by the TIBEC device, is fed to the TIBEC VIDEO OUT connector. In the illustrated A/B Roll set-up, the TIBEC OUT video signal is connected to a second input of the S.E.G.. The output of the S.E.G. is wired to the video input of the destination recording VTR and/or to any other destination equipment, such as a monitor or a transmitter.

If the video signal connected to the Master Video Input of the TIBEC conforms with EIA Standard RS-170-A, (such as the signal of most video cameras and all Sync Generators) so will the Slave VTR TIBEC-processed video output. Consequently, such signal will meet the FCC standards for NTSC broadcast video and can be legally broadcast.

However, if the video signal connected to the Master Input of the TIBEC is generated by a VTR, videodisk player or other equipment that provides incorrect video, the TIBEC OUTPUT will be also incorrect video, but it will exhibit the same Time Base Error of the Master VTR. Such signal can not be legally aired. However, the signals of both the Master and Slave VTR's can be mixed, dissolved, split or otherwise processed by a S.E.G. and then re-recorded in the Output VTR. Once the A/B edited tape is completed, it can be played back in the Slave VTR. In this second pass, the TIBEC Master Input may be connected to a correct video signal or sync generator. THEN the processed and edited TIBEC OUTPUT signal will be fully corrected and, consequently, legally suitable for broadcast use.

TIBEC Precorrector Block Diagram Description.

Figure 2A:
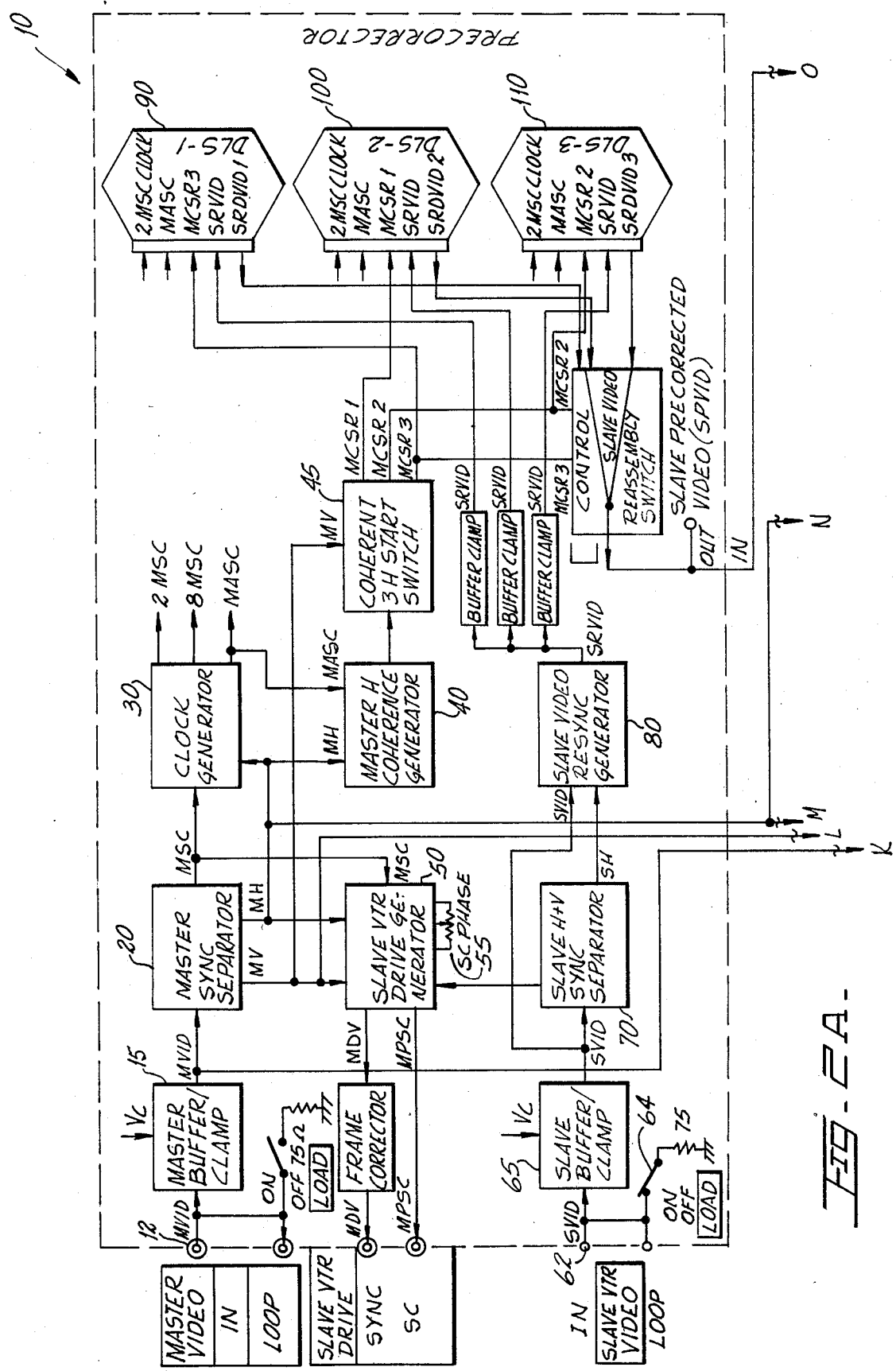
FIG. 2A represents a block diagram of the Precorrector section of the present invention.
Figure 2B:
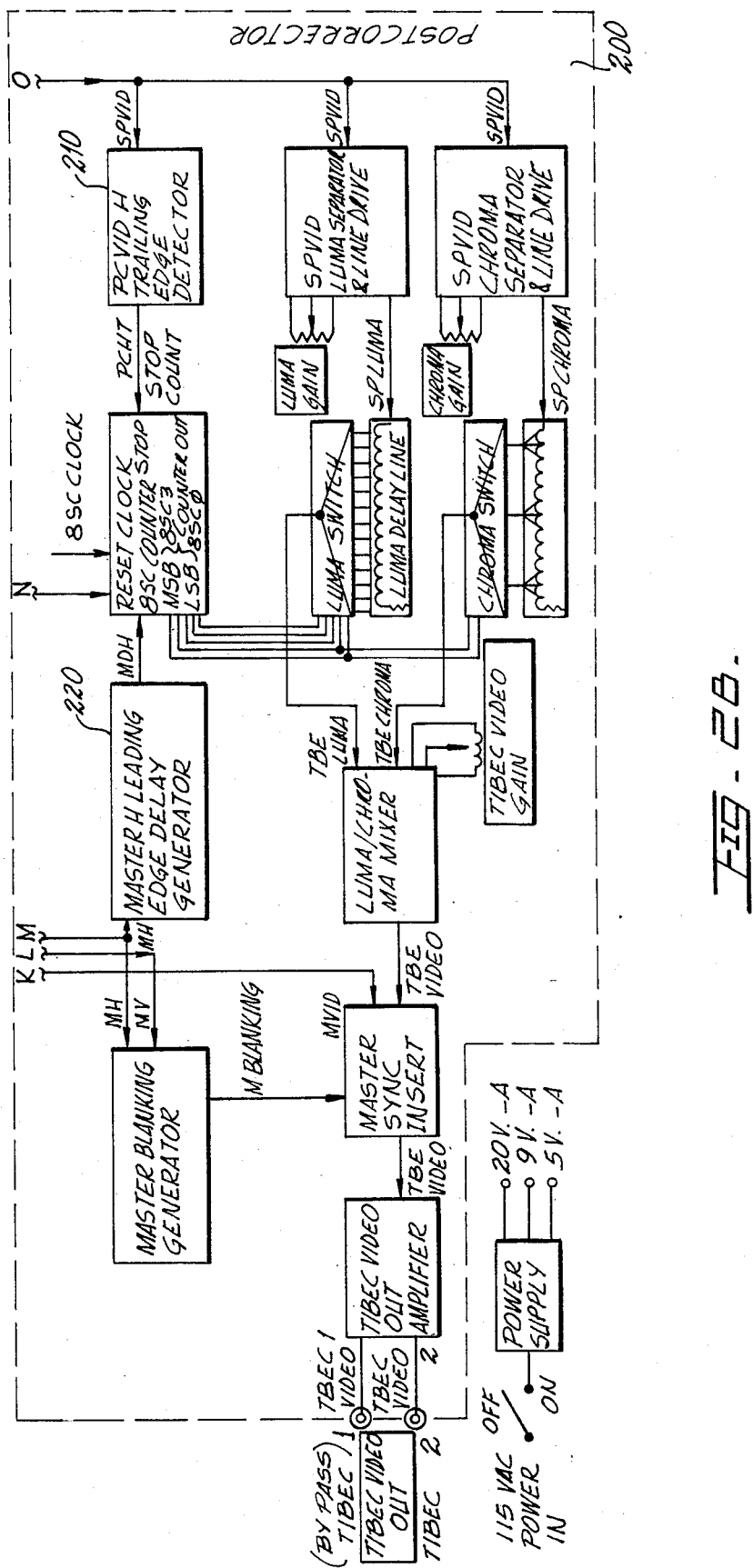
FIG. 2B represents a block diagram of the Postcorrector section of the present invention.

FIGS. 2A and 2B represent block diagrams of the TIBEC device 1, showing its major circuit blocks and tracing the signal flow between them. The TIBEC device can be divided into two major sections, the Precorrector 10 and the Postcorrector 200. The function of the Precorrector circuit blocks will be described first. Then the Postcorrector will be explained.

Mater Video Buffer Clamp.

Referring now to FIG. 2A, the Master Video signal, MVID, is applied to the MASTER VIDEO IN connector 12 and fed to Buffer Clamp Circuit 15 that establishes a DC reference, Vc, at the bottom of the sync pulses. The same reference will be established for any other video signal throughout the TIBEC device as required.

Master Sync Separator.

The clamped MVID is then fed to Master Sync Separator 20, extracting the Horizontal, MH, Vertical, MV, and subcarrier burst, from MVID and regenerates a continuous subcarrier signal, MSC, in phase with the burst. The MSC and the MH outputs of Master Sync Separator 20 are then fed to Clock Generator 30.

Clock Generator.

Clock Generator 30 synthesizes from MSC two signals with frequencies exactly equal to twice, 2MSC, and eight times, 8MSC, the subcarrier frequency, and by using MH at its input, a Master Alternating Subcarrier signal, MASC, is produced with the same frequency of MSC, but with a phase that alternates from 0 to 180 degrees in relation with MSC near the center of each MH interval. In other words, near the center of each consecutive line the phase of the MASC signal is changed by 180° degrees (inverted) and this is needed to achieve proper operation of the coherence circuits, namely, Master H Coherence Generator 40 and Coherent Stop Generator 104 (within the DLS-X circuits 90, 100 or 110) (described below). The three outputs of the clock generator, 2SC, 8SC and MASC, are made available to other circuits on the TIBEC unit 1.

Master H Coherence Generator.

The Master H Coherence Generator circuit 40 receives inputs MH and MASC signals from Master Sync Separator 20 and Clock Generator 30 and outputs master horizontal coherent signal, MHC, with the same repetition rate as MH. However, the leading edge of MHC is delayed until the leading edge of the first MASC pulse after each MH pulse occurs. The delay may vary from 0 to 1/MASC (0 to 279 nSec.). Since the phase relationship between MHC and SC is constant, MHC is coherent in accordance with the terminology of this application.

Coherent 3H-Start Switch.

The Coherent 3H-Start Switch circuit 45 uses MHC and the Master Vertical pulse MV to generate three output signals called MCSR1, MCSR2 and MCSR3, or, collectively, referred to as Master Coherent Start "x", or MCSRx. At the begining of each video frame—or MV pulse,—the leading edges of the first three MHC pulses trigger the first set of consecutive MCSR1, MCSR2 and MCSR3 pulses. The cycle repeats itself until it is reset by the following MV pulse. The duration of each MCSRx pulse is made equal to one MHC interval. The duty cycle of the MCSRx pulses is 1:3, being high for one line and low for the next two lines.

The MCSRx pulses are also coherent since are timed by the coherent MHC pulse. MCRSx are used to start the clocks in the three DLS modules, 90; 100 and 110, described below, and to control the Slave Video Reassembly Switch, described below.

Slave VTR Drive Generator.

The MV and MH outputs of Master Sync Separator are fed to the Slave VTR Drive Generator 50. On it, the 60 Hertz MV signal is delayed 260 MH intervals with respect to MV and buffered with a 75 ohm output impedance. Since a video field contains 262 and ½ lines (262.5 MH) and the Precorrector delays the Slave Video by 2 and ½ lines, then the required delay is the above mentioned 260 lines (260 MH). The resultant Master Delayed Vertical signal, MDV, is connected to the SYNC OUT connector which is connected to the Slave VTR 5 Sync input port. In addition, the MSC signal is passed through a 360+ degree phase shifting circuit, controllable from the front panel SC PHASE control 55. The phase controlled MSC signal, MPSC, is then buffered with a 75 ohm output impedance and sent to the SC OUT connector which is in turn connected to the input port of the Slave VTR 5.

A VTR in playback mode requires a 60 Hz. reference signal to drive its drum servo, and a 3.579545 (3.58) MHz. signal to refer to and modulate with respect to the chroma contents of the recorded signal in a form playable by a regular TV set or video monitor. When the VTR is in "self-running" mode, these two signals are generated internally in the VTR by a 3.58 MHz. crystal oscillator and a dividing chain that provides, among others, a submultiple of 3.58 MHz. very close to 60 Hz.

Externally synchronizable VTR's use these two signals (SYNC and SC), supplied by an external source, such as the TIBEC or a TBC, replacing the internally generated signals. In this case, the video output of the Slave VTR is then vertically locked to the signal injected at the SYNC IN connector, and its chroma contents are referred to the phase of the 3.58 MHz. signal connected to the SC IN connector.

Low cost consumer or industrial VCR's do not have External Sync connectors. However, a simple modification of these machines: VTR External Drive circuitry, provides them with this capability that is essential for the operation of the TIBEC device 1 or any TBC. The driving signals are passed through a signal detection circuit that senses the presence of BOTH signals at the external connectors. The output of the signal detector controls a two channel, two position data selector circuit. When the signal detector senses the absence on any one of the two required input signals, the data selector feeds the internally generated signals to the VCR circuits, and the VCR operates in "free-running" mode.

When two signals such as MDV and MPSC are injected at the drive inputs, the data selector replaces the internal signals by the external ones, and the VTR becomes slaved to or driven by the MDV and MPSC Sync signals.

Slave Video Buffer Clamp.

The video signal played back by the Slave (or driven) VTR, SVID, is applied to the Slave Video Input connector 62 of TIBEC device 1. A load switch 64 permits proper transmission line loading. The buffered video signal SVID, is fed to a Slave Buffer Clamp circuit 65 similar to the Master Video Buffer Clamp Circuit 15, and referenced to the same bias voltage, Vc. Consequently, at the output of both clamps, both signals have the same DC bias.

Slave H+V Sync Separator.

The SVID signal is fed to Slave H+V Sync Separator 70. This circuit extracts the Horizontal, SH, and Vertical, SV, components of the Slave Video input. No SC separation is required since the SVID subcarrier is phase locked to the SC OUT signal sent to the Slave VTR 5 SC INput, and, consequently, is already available in TIBEC device 1.

Slave Video Resync Generator.

The Slave Video Resync Generator Circuit 80 replaces the horizontal sync pulse of the SVID by a new horizontal pulse. The leading edge of the new pulse is coincident with the leading edge of SH, but the pulse width is replaced and made constant, regardless of the width of the SH pulse played back by the Slave VTR. The trailing edge of the SVID horizontal sync, after being processed by the TIBEC Precorrector 10, is used by the Postcorrector as the timing reference for the luminance contents of the signal. The Slave Video signal emerging from Resync Generator 80 is called Slave Resynced Video, of SRVID.

Delay Line Sync (DLS) Circuit Blocks.

The Three Delay Sync (DLS) Circuit Blocks 90, 100 and 110 (DLS1, DLS2 and DLS3, or, collectively referred to as DLSx), are the video processing elements of the TIBEC Precorrector 10. The position and connections of the three DLSx circuits in the TIBEC unit 1 is shown in FIG. 2A. A more detailed block diagram of the block is presented in FIG. 3. The three circuit blocks are identical and interchangeable, and its circuit elements are described below:

Delay Line, EDL Circuit 101 is a commercially available IC, Fanchild's CCD 321 A: 455/910-Bit Analog Shift Register in the preferred embodiment, that uses a 910 steps "bucket brigade" technique to transfer an electrical charge from its input, SRVID, to its output, SRDVID, under control of a clock signal. If the effective clock rate is 4MSC, the delay between input and output will be 910/4MSC, or one MH when NTSC video is applied at the input. The input video SRVID is sampled at the input at 4MSC rate. An electric charge proportional to the instantaneous voltage at each sampling time is placed in the input "bucket", and the charge is shifted to the next bucket at each clock pulse rising or falling edge. The charge emerges at the output pins after 910 transitions, and one MH delayed video signal can be regenerated by converting the emerging charge into an analog voltage in the line loading circuit.

The effective clock frequency is twice the line clock frequency since a charge shift occurs at each clock edge, and each clock cycle has two edges. Consequently, a 2MSC clock frequency is required to achieve an effective clock rate of 4MSC.

If the clock is stopped, the charge held at each of the 910 "buckets" of the line is held stationary, and the line voltage output drops to 0. Any signal present at the line input when the line is stopped is lost, since the input sampling also stops.

It is important to note when the clock restarts, the 910 charge samples held in the line during the time on which the clock was halted, are outputted first. Since the clocks are stopped by a coherent pulse derived from the emerging video (the SDTH pulse described below), the SVID horizontal line is stored in the EDL during the stop interval, with the last line "bucket",—i.e., the first to be outputted at restart,—holding the first coherent sampling charge subsequent to the leading edge of the SVID horizontal sync pulse.

At restart time, the line resumes its input sampling and shifting process. The video signal present at the inputs of the three EDL lines is the Slave Resynced Video signal, SRVID. The output of each EDL video delay line is called Slave Resynced Delayed Video, or SRDVID1, SRDVID2 and SRDVID3, or, in general SRDVIDx. Suffix 1, 2 and 3 corresponds to the suffix of the DLSx module that holds each EDLx line.

Low Pass Filter and Video Amplifier Clamp.

The SRDVIDx signals are passed by a low pass filter to remove the high-frequency sampling components that appear at the end of the EDL line, amplified to restore the standard 1 Volt peak to peak level, and reclamped with respect to the reference voltage Vc. Then, SRDVIDx is sent to its H sync separator.

Delayed Video H Sync Separator.

Delayed Video H Sync Separator Circuit 103 extracts the H sync component, SDH, of the video that emerges from the Charge-Coupled, Electrically Driven Delay Line, EDL 101, that is included on each DLS module, after such signal is amplified and filtered by the LPF-Video Amplifier block. The operation of the EDL, and the LPF-Video Amplifier is described below.

Coherent Stop Generator.

Coherent Stop Generator Circuit 104 has its inputs connected to the SDH and MASC signals, and outputs a pulse, Slave Delayed Stop Horizontal pulse, SDTH, that occur after each SDH, but that it is delayed until the leading edge of the first MASC pulse after each SDH occurs. The delay may be from 0 to 1/MASC (0 to 279 nSec.). The phase relationship between SDTH and MSC is then constant, and SDTH is a coherent pulse.

Clock Start-Stop Generator.

Clock Start-Stop Generator Circuit 105 determines if the DLS clock signals, 2MSC, are applied to or cut off from the clock input pins of the Electrically Driven Delay Lines, EDL's. The start of the clock is determined by the arrival of the leading edge of a MCSRx pulse. Specifically, MCSR3 starts DLS1, MCSR1 starts DLS2 and MCSR2 starts DLS3. At the start, the 2MSC clock is applied to the clock input pins of the EDL integrated circuit, and the line "runs" until it is stopped by the stop pulse.

After each clock stop, the EDL stops running, only to restart again at the arrival of the next MCSRx pulse. It shall be noted that the clock is started by a pulse derived from the Master Video, MCSRx, and stopped by a pulse derived from the Slave Video, namely the SDTH. The implications of such arrangement are discussed below.

A second function of the Clock Start-Stop Generator is to assure that the DLS clock is always stopped when low, regardless of when the coherent stop pulse, SDTH, arrives. This feature is no cause for loss of coherence of the stop signal, since both signals, STDH and SMSC, are indeed coherent with each other.

Slave Video Reassembly Switch.

Slave Video Reassembly Switch 150, SVR Circuit 150 is an analog switch with three inputs, one output and two control lines. The three DLSx output video signals, SRDVID1, SRDVID2 and SRDVID3, are connected to inputs 1, 2 and 3 of the analog switch. At its output emerges a video signal, the Slave Precorrected Video signal, SPVID, that is the output of the Precorrector Section of the TIBEC device.

The SVR switch control signals are the outputs MCSR2 and MCSR3 of the Master Coherent 3H Start Switch described above. The SVR Switch control logic is such that when both control signals are low, input 1 of the SVR switch is at the output. Indeed, MCSR1 and MCSR2 are both low only when MCSR1 is high. When either of the two control signals, MCSR2 or MCSR3, is high, the output is connected to the corresponding input (2 or 3). Consequently, the outputs of the SVR Switch is SRDVID1, SRDVID2 and SRDVID3 in a rotating fashion progressing across each video frame.

It is important to note that since the above mentioned three states of the two control signals cycle every three Master Horizontal Coherent, MHC, pulses, the output of the SVR Switch consists only of the first complete horizontal intervals of each SRDVIDx video that emerge from the DLSx modules immediately after restart of each DLSx clock.

As discussed above, the first output of a DLSx module after each restart is the video that was held within a delay line when its clock was stopped. Since each clock start is originated by the same signals that control the SVR Switch, MCSRx, it becomes clear that the reassembled video SPVID at the output of the SVR Switch is the Slave Video SVID, now nearly synchronized with MVID. The residual jitter goes from "0" to −2MSC periods, or from "0" to 279 times two=558 n sec In despite of the presence of residual jitter, and due to the use of coherent pulses MCSRx and SDTH, to start and stop respectively the DLSx clocks 105, the SPVID signal retains its chroma contents in phase with the MSC subcarrier, and, consequently, these chroma contents can be decoded with respect to MSC. In essence, the Precorrector device corrects the timing of the Slave Video from a theoretically infinite value down to 558 n sec, and in doing so retains the coherence of the chroma portion of the Slave Video with respect to the Master Subcarrier signal MSC. Since the residual luma jitter is still perceptible in TV sets or monitors, this processed video signal may be further corrected through Postcorrector 200.

TIBEC Postcorrector Block Diagram Description.

Referring now to FIG. 3, the TIBEC Postcorrector 200 uses as its input signal the Slave Precorrected video signal, SPVID. The peculiar characteristics of SPVID have been described previously.

The Postcorrector Section of the TIBEC device further processes SPVID to eliminate the residual luma jitter of +/− one MSC (or +/−279 nanoseconds), and also processes the chroma contents of SVID to align it with the luma within the MSC cycle nearest to its original location on the Slave VTR video signal.

Precorrected Video H Trailing Edge Detector.

The Precorrected Video H Trailing Edge Detector Circuit 210 separates the H sync pulse of SPVID, and then recovers the trailing edge of the pulse, PCHT, that is used as timing reference for the postprocessing of the luma portion of the signal.

EIA standard RS-170-A refers all H timing signals to the leading edge of the H pulse. The leading edge of SPVID can not be used as timing reference due to the operation of the EDL delay lines described above. As stated, the first part of each video line outputted at EDL restart is the portion of the line immediately subsequent to the leading edge of the SVID horizontal sync pulse. The leading edge of the H pulse at the begining of each line was "lost" in order to stop the DLS line. The leading edge that appears on SPVID belongs to the end of the "previous" line, just before it is switched out by the SVR Switch 150.

Any part of the H interval that maintains a fixed timing with the contents of the video on that line could be used as sync reference. A convenient arrangement is to use the trailing edge of the H pulse, PCHT, since it can be easily detected by appropriate circuits.

In addition, PCHT is not derived from the trailing edge of the H pulse played back by the Slave VTR signal, but from the new SH pulse trailing edge created by the Slave Video resync generator 80. Consequently, PCHT can replace the leading edge as SVID timing reference, regardless of the H pulse width recorded in and/or played back by the Slave VTR.

Master H Leading Edge Delay Generator.

The Master H Leading Edge Delay Generator Circuit 220 delays the leading edge of MH for a time interval equal to the Slave Video Resynced H pulse width of SRVID. The output of this circuit, MDH, would be in exact coincidence with PCHT if SVID were without residual jitter. In the presence of residual jitter, PCHT lags behind MDH for an interval of 0 to 558 nanoseconds, depending of the value of such residual jitter.

8SC Counter.

The 8SC Counter Circuit 230 is a digital ripple clock counter. Its clock input is connected to the 8SC output of the Clock Generator 30 described in above. The counter is reset to 0 at the MH leading edge. It starts counting when MDH occurs and stops and holds its count when PCHT arrives. Indeed, it counts the amount of residual jitter in units equal to the 8SC period, or 35 nanoseconds.

The count on each H may vary from 0 to 15 decimal, so its output can be represented with four binary bits. A demultiplexer at the output of the ripple clock converts the binary clock output into four separate signals representing the values of each count bit. These four signals are referred to as 8SC0; 8SC1; 8SC2 and 8SC3, with 8SC0 being the least significant bit of the count.

Luma Switch.

Luma Switch Circuit 250 is a single output, 16 inputs analog switch with a 4 bit digital control. The four control pins are connected to the four outputs of the 8SC counter, 8SC0 to 8SC3. The analog signal at its input is the luma contents of SPVID, or PC Luma, available from the output of the SPVID Luma Separator circuit described below.

SPVID Luma Separator.

SPVID Luma Separator Circuit 240 separates the luma contents of SPVID. It uses a low pass filter with a cut-off frequency around 3.2 MHz., and a trap at 3.58 MHz. to further attenuate the chroma contents of the signal. Also part of this circuit are the impedance matching amplifier and a gain adjusting network. The LUMA GAIN control 241 shall be designed with the proper control range and mounted on the external panel of the TIBED case. If so, it becomes a part of a conventional built-in Slave Video Process Amplifier. The output of the Luma Separator circuit 240 is called Slave Postcorrected LUMA, SP Luma.

Luma Delay Line.

The SP Luma signal is applied to the single input of the Luma Delay Line Circuit 260. This circuit is a passive, lumped constants delay line with 16 taps located at points on the delay line that generate 16 equal delay periods as the signal travels through the delay line. The delay between each tap is 35 nanoseconds, and, consequently, the total delay in the line is 540 nanoseconds, equal to two complete MSC cycles.

To avoid reflections in the line, the luma signal must be fed from a source with an internal impedance equal to characteristic impedance of the delay line and the line must be also loaded with the same impedance. The circuits to achieve proper line loading are considered as part of this block.

The 16 taps of the delay line are connected to the 16 inputs of the Luma Switch described above. The connection is made such that when the counter is at its highest value, the tap selected for output is the one causing the least delay. On the opposite end, when the counter is at its lowest value, (Zero), the last tap of the delay line is connected to the output. The intermediate taps are connected in the corresponding order.

The combined action of the circuit blocks described above becomes now apparent. The 8SC counter applied to the Luma Switch is reset at zero at the very begining of each H interval, and the counter measures and holds the SPVID delay of each line as compared with MVID in 1/MSC (35 nSec.) units of time. Consequently, the Luma signal emerging from the Luma Switch, Time Base Equalized Luma or TBE Luma, will have its timing equalized to the Master Video, and the residual jitter has been reduced to any value within the 35 nanaoseconds interval of each tap of the Luma Delay Line.

A further refinement of the Luma correction process can be easily achieved by delaying the Luma signal by one half of ½SC (17.5 n sec) BEFORE it is injected into the Luma Delay line, and then shifting all the taps one position back from their previous connections to the Luma Switch Inputs. The combined result of both actions is to align the TBE Luma output with the center of each tap of the Luma Delay Line, and so to make the residual jitter equal to +/−17.5 nanoseconds.

The numerical values used in the description above, relate to one particular design of the TIBEC device. It is pointed out here that values other than 8SC can be used as counter clock, values other than ½SC may be used as delay per tap on the Luma Delay line, and the 8SC counter can use a different arrangement or number of bits to measure the residual jitter. Consequently, the reduction of residual jitter caused by the combined action of these circuits can be reduced as required. Such changes in no way imply any modification of the patent applied for.

SPVID Chroma Separator and Line Driver.

SPVID Chroma Separator and Line Driver Circuit 310 is a band pass filter (BPF) with its passing band centered at 3.58 MHz., and sidebands that let pass the subcarrier sidebands required to transmit the chroma information played by the Slave VTR. The output of the BPF is amplified to restore its proper level. At this point, a CHROMA GAIN control may be range-limited and installed at the front panel of the TIBEC case. This control becomes another very useful element for he built-in Slave Video Process Amplifier. Its output is called Slave Precorrected Chroma, or SP Chroma for short.

Chroma Delay Line.

The Chroma Delay Line Circuit 320 includes a passive, lumped constant delay line that uses three taps. The taps are located at line positions generating delays of $\frac{1}{2}$, $1\frac{1}{2}$ and $2\frac{1}{2}$ periods of MSC. Trimming elements are installed at each output to insure that the delays are exactly as stated, with a tolerance of $+/-1$ degree of the MSC cycle, as required by RS-170-A standard. The line input is the SP Chroma just described, that is applied to the delay line thru an impedance matching circuit.

Chroma Switch.

Chroma Switch 330 is a digitally controlled analog switch with three inputs and one output. The three analog inputs are connected to the three outputs of the Chroma Delay Line described just above, and the control inputs to the two most significant bits of the output of the 8SC counter, 8SC2 and 8SC3.

At the output pin of the Chroma Switch 330 appears a signal, Time Base Equalized Chroma or TBE Chroma, that has several important characteristics:

First, the signal is coherent with the Master Video signal, since its originating signal, SPVID, is coherent, and the delays introduced at the Postcorrector are integer multiples of the period of the Master Subcarrier.

Second, the TBE Chroma is aligned with its original position on the Slave Video, as closely as theoretically possible for time base equalization with common subcarrier reference.

Third, the risidual jitter present in the TBE chroma is nearly invisible in a color monitor or TV set, since the bandwidth of the eletro-optical modulation transfer function of a color CRT is sharply limited in chroma by the size of the triple-dot phosphor matrix that recreates the optical image. In addition the chroma process of VTR's also limits the bandwidth of the recorder video signal. Video tape playback machines color resolution is almost universally low. In most current industrial VTR's and VCR's, as in consumer VCR's, the H Color Resolution is specified at 270 lines or lower. This value, translated in terms of subcarrier cycles, is just a little higher than one subcarrier period. (Note that there are 227.5 SC cycles per H period in RS-170-A video). The color information, phase-modulated versus the subcarrier, can hardly reach frequency excursions so close to the carrier frequency.

The end result of these three characteristics of the TBE Chroma signal is that while its coherence is restored with respect to the Master Video, it does not produce any observable position jitter in the final picture.

Luma Chroma Mixer.

The Luma Chroma Mixer Circuit 270 is a Non-Add-Mixing circuit that recombines TBE Luma and TBE chroma and outputs the Time Base Equalized video, or TBEVID. Prior to recombination, both components are clamped to the same DC level, Vc. This circuit is a convenient place to install a video gain control circuit. If installed, it can be labelled at the outside panel as TIBEC VIDEO GIAN, being one more part of the Slave Video Process Amplifier.

Master Blanking Generator.

Master Blanking Generator Circuit 340 derives from the Master Video H and V signals, MH and MV, a composite signal that is identical to the blanking signal used to erase the horizontal and vertical retrace beam of a display CRT, as defined by EIA standard RS-170-A.

Master Sync Insert Circuit 290 replaces the horizontal and vertical composite sync componets of TBEVID by the same components of the Master Video, MVID signal. A simple two-position analog switch controlled by the output of the Master Blanking Generator described above can be used as Master Sync Insert cicuit.

TIBEC Video Output Amplifier.

TIBEC Video Output Amplifier Circuit 300 is a video power amplifier. Its input is the TBEVID signal resynced with the MVID sync, called Time Base Equalized Video or TIBEC VIDEO. Its output, sent to the TIBEC VIDEO OUT connector(s), has level of 1 volt peak to peak over a load of 75 ohms, corresponding to standard video transmission lines. In FIG. 3, two outputs are shown, TIBEC1 and TIBEC2, for convenience.

Figure 4:
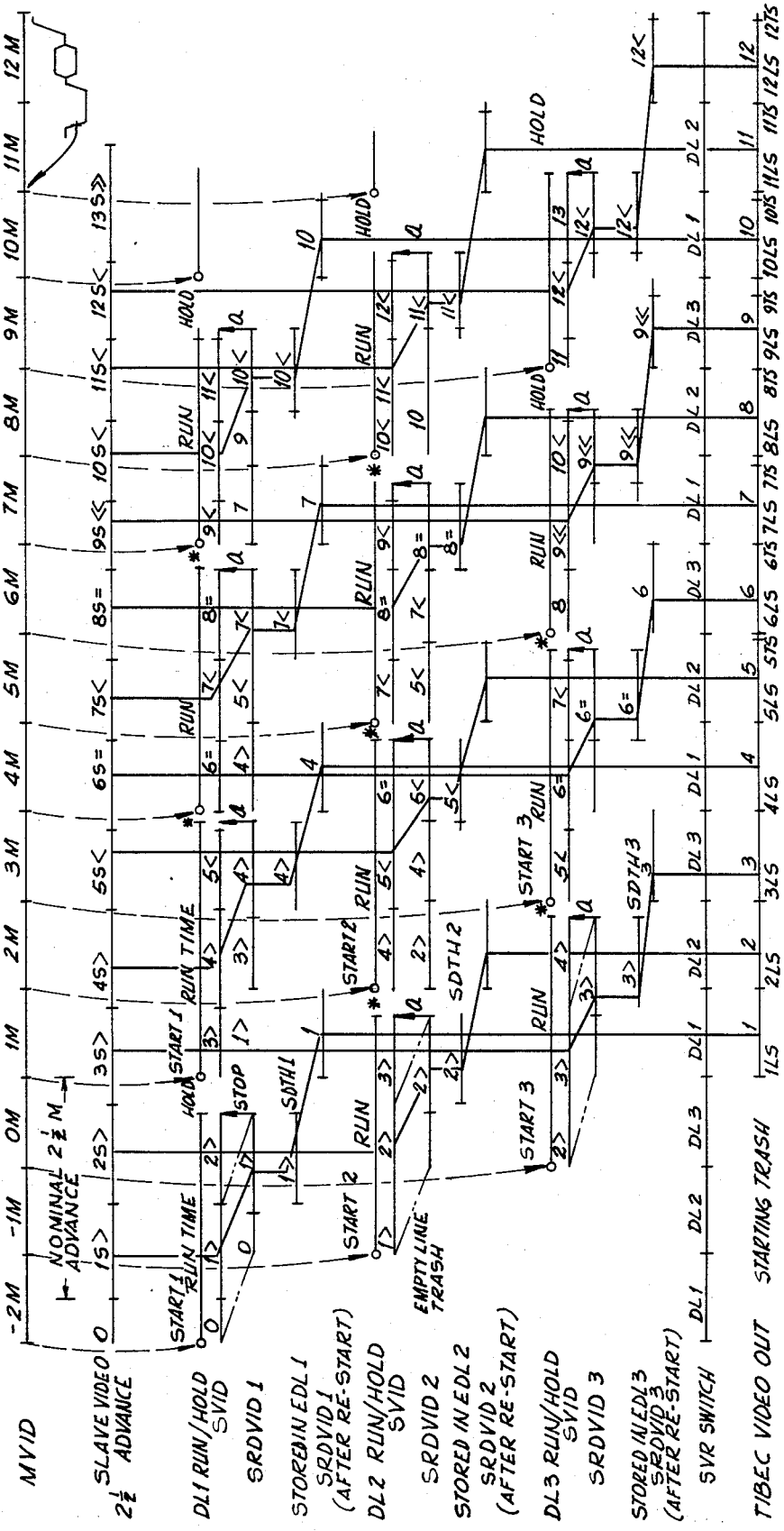
FIG. 4 is a timing chart showing the time relationship of the Master Video and the different equalization stages of the Slave Video as it progresses through the TIBEC device.

FIG. 4 is a timing chart designed to illustrate the timing of events taking place at the TIBEC Precorrector. The X-axis is time, represented in 1H units, and the various lines on the ordinate axis represent time-correlated events. On each of the 19 lines of FIG. 4, the short vertical traces over each line represent the leading edge of each horizontal sync pulse, as illustrated on the top right of the Figure. The drawing deliberately ignores the delaying effects of the coherence-related circuit elements, discussed elsewhere in this application.

The first line represents the Master Video signal MVID. Each line of a video field is labelled with a number followed by suffix M. MVID is the basic time reference for FIG. 4. The drawing shows all lines of equal length. This may not mean identical times if MVID is a VTR playback video, but the general idea of the chart is unaffected by such possibility.

The slave VTR video SVID is shown next. The SVID lines are also labelled with the line number and the suffix S. In addition, symbols $>$, $=$ and $<$, occasionally repeated to illustrate a more pronounced jitter (or time anomaly), indicate that the duration of each line is longer, equal to or shorter than the corresponding line of the Master Video MVID. SVID is shown advanced $2\frac{1}{2}$ lines with respect to MVID. Again, other SVID durations and advances are possible without detracting from the general concept of the chart.

Lines 3–4, 8–9 and 13–14 of FIG. 4 show the running time on each DLx (delay line x) module and the video being inputted into each DL module. The dashed lines between MVID and each DLx START time indicate that it is indeed the arrival of the coherentized MVID sync pulse what causes each DLx module to start running. Lines 5, 10 and 15 represent the delayed video signal SRVIDx available at the output of each DLx module.

The arrows pointing up at the right side segments of each SRVIDx signal indicate that it is the detection of the horizontal sync emerging from the output of the EDLx IC, after being coherentized, what signals the delay line to stop its clocks. The DLSx module stops running and holds the video loaded on the EDLx until the module is started again by the MH pulse arriving through the Coherent 3H start switch. The stored video is represented in FIG. 4, lines 6, 11 and 16 for each module.

The stored video is played back and available at the output of each module after each line restarts, as shown in lines 7, 12 and 17. These are the signals reassembled by the SVR switch, which status is shown in line 18 of the FIG. 4. The reassembled video is illustrated in line 19, that represents the output of the TIBEC Precorrector.

This vertical discending lines trace the timing of each slave VTR video line from the TIBEC slave video input to the Precorrector output, and after postcorrection to the TIBEC output. By following these lines it becomes easier to understand the timing of events taking place in the present invention.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. A video signal processing device for equalizing the timing errors of a Slave Video tape recorder playback video signal to a Master Time Reference Video signal, and said slave recorder including external Sync and Subcarriers circuits, comprising:

A. first means for buffering and clamping said Master signal Time Reference Video having one output;

B. second means for separating the vertical, MV, horizontal, MH, and subcarrier MSC components of said Master Time Reference Video signal connected to said output of said first means for buffering and clamping said Master Time Reference Video signal;

C. driving means having three inputs connected to the three outputs of said components of said means for separating said vertical, horizontal and subcarrier components and receiving said components at said input and producing two outputs, a Master Delayed Vertical signal, MDV, and a Master Phased Subcarrier signal, MPSC, and said outputs being connected to said external Sync and Subcarrier circuits of said Slave Video tape recorder;

D. clock generator means having two inputs and one of said inputs being connected to said Master Subcarrier component output and the other input being connected to said Master Horizontal component output and so designed to produce three outputs wherein the first one, 2MSC, is similar to said MSC at twice its frequency, the second one is similar to MSC at an integer multiple of its frequency and the third one, MASC, is an alternating phase signal with the same frequency as MSC;

E. Master Coherence Generator means, having two inputs connected to said Master Horizontal, MH, and Master Alternating Subcarrier, MASC, signals, for generating a Master Horizontal Coherent, MHC, signal having the same repetition rate as said MH signal and further having its leading edge delayed so that it substantially coincides with the leading edge of the first MASC pulse after each MH pulse occurs;

F. Master Coherent start switch means for generating three coherent start signals, MCSR1, MCSR2 and MCSR3, having two inputs, using said MHC and MV signals as said inputs, wherein said start signals are triggered at the beginning of each video frame, MV pulses, by the leading edges of the first three MHC pulses so that said start signals are produced consecutively, and this cycle repeating itself until reset by the following MV pulse;

G. third means for buffering and clamping said Slave Video signal having one output;

H. fourth means for separating the vertical and horizontal components of said Slave Video signal connected to said output of said third means for buffering and clamping said Slave signal;

I. resync generator means for producing a slave resynchronized video, SRVID, signal having two inputs connected to the output, SVID, of said third means for buffering and clamping said Slave video signal and to the horizontal component, SH, output of said fourth means for separating said vertical and horizontal components of said Slave signal so that the leading edge of said Slave horizontal sync pulse component of said SRVID signal substantially coincides with the leading edge of SH and the pulse width of SRVID is constant and independent of the pulse width of said Slave Video signal;

J. three delay line sychronization means for generating three slave resynchronized delayed video output signals, SRDVID1, SRDVID2 and SRDVID3 and having each four inputs, three of said four inputs being connected to said 2MSC, MASC, SRVID and the remaining input in each of said delay line synchronization means being connected respectively to MCSR1, MCSR2 and MCSR3 signals and further including means for delaying said signals so that said resulting output signals SRVID1, SRVID2 and SRVID3 are delayed for a period of time such that the stored Slave Video restarts in near synchronization with the Master Time Reference Video signal; and K. Slave Video reassembly switch means for commuting the output signals, SRDVID1, SRDVID2 and SRDVID3, of said delay line synchronization means and said reassembly switch means being controlled by any two of said MCSR1, MCSR2 and MCSR3 signals so that their logic state will determine which one of said output signals is to appear at the output of said switch reassembly means and connected to the output SPVID of said processing device.

2. The device set forth in claim 1 further including a postcorrector device, comprising:

L. fifth means for detecting the trailing edge of the horizontal sync pulse of the output SPVID of said processing device and producing a Precorrected Horizontal Trailing Edge signal, PCHT;

M. sixth means for delaying the Master Horizontal signal, MH, thereby producing a Master Delayed Horizontal signal, MDH, that has its leading edge delayed a time interval equal to the pulse width of the Slave Video Resynced H pulse of SRVID output signal of said resync generator means;

N. counter means having its input connected to said second output of said clock generator means and said counter means being adapted to be reset at the leading edge of the Master Horizontal signal, MH, and being also adapted to start counting when said MDH signal occurs and stops, holding its count, when said PCHT signal arrives thereby counting the amount of residual jitter in units of time equal to the period the selected multiple of the Master Subcarrier and holding the counter output until the next Master Horizontal leading edge arrives;

O. seventh means for separating the luminance component from said SPVID signal;

P. first switch means for selecting one of a plurality of inputs according to said counter output and further including first multi-tap delay means connected to said inputs so that the output of said means for separating the luminance component is routed through said first multi-top delay means and extracted from the tap selected by the counter output thereby adjusting the delay according to the amount of jitter detected by the counter means;

Q. eighth means for separating the chrominance component from said SPVID signal;

R. second switch means for selecting one of a plurality of inputs according to said counter output, and further including second multi-top delay means connected to said inputs so that the output of said eighth means for separating the chrominance component is routed through said second multi-top delay means and extracted from the tap selected by said counter output thereby adjusting the alignment of the chrominance information with the luminance information without losing the phase of the chrominance information;

S. ninth means for mixing the output of said first and second switch means;

T. Master blanking generator means receiving the Master Horizontal and Vertical signals, MH and MV, at its inputs generating at its output a composite Master blanking signal; and U. tenth means for replacing the composite sync portion of the output signal of said ninth means with the composite sync portion of the Master Time Reference Video signal as controlled by said Master blanking signal.

3. A device as set forth in claim 1, further comprising means for measuring jitter in a Slave Video signal with respect to said Master Time Reference Video signal, comprising:

A. means for detecting the trailing edge of the reference point in the luma component of said Slave Video signal so that a Slave Horizontal Trailing edge signal, SHT, is produced;

B. means for delaying the horizontal sync component, MH, of said Master Time Reference Video signal thereby producing a master delay signal, MDH, that has its leading edge delayed a predetermined time interval;

C. means for generating a clock signal that is a predetermined multiple of the frequency of the subcarrier of said Master Time Reference Video signal; and D. counter means having its input connected to said clock signal and being adapted to be reset at the leading edge of the horizontal sync component, MH, said Master Time Reference Video signal, and being also adapted to start counting when said MDH signal occurs and stops, holding its count, when said SHT signal arrives thereby counting the amount of jitter in units of time that are equal to the period of the multiple of the Master Subcarrier and holding the count on said counter means output until the next master horizontal leading edge arrives.

4. The device set forth in claim 3 further including:

E. means for separating the luminance component from said Slave Video signal;

F. means for separating the chrominance component from said Slave Video signal;

G. first selection switch means for selecting one of a plurality of inputs according to said counter output and further including first multi-tap delay means connected to said inputs so that the output of said means for separating the luminance component is routed through said first multi-top delay means and extracted from the tap selected by the counter output thereby adjusting the delay according to the amount of jitter detected by the counter so that the output of said first switch means is delayed to complement the jitter circuit;

H. second selection switch means for selecting one of a plurality of inputs according to said counter output, and further including second multi-top delay means connected to said inputs so that the output of said means for separating the chrominance component is routed second multi-top delay means and extracted from the tap selected by said counter output thereby adjusting the alignment of the chrominance information with the luminance information without losing the phase of the chrominance information;

I. means for mixing the outputs of said first and second selection switch means.

* * * * *